United States Patent
Zadecki et al.

(10) Patent No.: US 10,653,176 B2
(45) Date of Patent: May 19, 2020

(54) APPARATUS FOR MANUFACTURING OF MULTI-ELEMENT RODS OF TOBACCO INDUSTRY

(71) Applicant: International Tobacco Machinery Poland Sp. z o. o., Radom (PL)

(72) Inventors: Robert Zadecki, Radom (PL); Pawel Krzeminski, Radom (PL)

(73) Assignee: International Tobacco Machinery Poland Sp. z o. o., Radom (PL)

( * ) Notice: Subject to any disclaimer, the term of this patent is extended or adjusted under 35 U.S.C. 154(b) by 0 days.

(21) Appl. No.: 16/189,796

(22) Filed: Nov. 13, 2018

(65) Prior Publication Data
US 2019/0183167 A1    Jun. 20, 2019

(30) Foreign Application Priority Data
Dec. 19, 2017   (EP) ..................................... 17208529

(51) Int. Cl.
*A24D 3/02* (2006.01)
*A24C 5/32* (2006.01)
(Continued)

(52) U.S. Cl.
CPC ............ *A24D 3/0287* (2013.01); *A24C 5/326* (2013.01); *A24C 5/327* (2013.01); *B65G 47/30* (2013.01); *B65G 47/848* (2013.01)

(58) Field of Classification Search
CPC ...... B65G 29/02; B65G 47/30; B65G 47/846; B65G 47/847; B65G 47/848; A24C 5/326;
(Continued)

(56) References Cited

U.S. PATENT DOCUMENTS

| 4,793,364 A | 12/1988 | Labbe |
| 9,833,019 B2 | 12/2017 | Ampolini |

(Continued)

FOREIGN PATENT DOCUMENTS

| EP | 1763306 B1 | 11/2009 |
| EP | 2210509 A1 | 7/2010 |

(Continued)

OTHER PUBLICATIONS

European Search Report in application EP17208528, completed Jun. 15, 2018.

(Continued)

*Primary Examiner* — James R Bidwell
(74) *Attorney, Agent, or Firm* — Oppedahl Patent Law Firm LLC

(57) ABSTRACT

An apparatus for manufacturing of multi-element rods of the tobacco industry comprising a feeding apparatus, a transferring apparatus, and a forming apparatus, comprising a first rotational element provided with lugs immobile relative to the first rotational element, a second rotational element provided with lugs immobile relative to the second rotational element, a third rotational element provided with lugs immobile relative to the third rotational element, used to convey rod-like elements. The rotational elements having notches between the lugs adapted to receive and convey the rod-like elements, whereas the rotational elements are arranged and adapted to guide the rod-like elements successively through the rotational elements. The apparatus comprises the forming apparatus designed to form a continuous multi-element rod, and a cutting apparatus. The apparatus according to the invention is characterised in that the third lugs have a thickness smaller than the thickness of the first lugs.

15 Claims, 7 Drawing Sheets

(51) Int. Cl.
*B65G 47/84* (2006.01)
*B65G 47/30* (2006.01)

(58) Field of Classification Search
CPC ......... A24C 5/327; A24C 5/46; A24C 5/1835; A24C 5/1828; A24D 3/0287; A24D 3/0254
USPC ...................................................... 198/459.2
See application file for complete search history.

(56) References Cited

U.S. PATENT DOCUMENTS

| | | |
|---|---|---|
| 10,306,917 B2 * | 6/2019 | Slowik .................. A24C 5/327 |
| 2005/0282693 A1 | 12/2005 | Garthaffner |
| 2012/0077659 A1 * | 3/2012 | Yanchev .............. A24D 3/0287 493/39 |
| 2015/0251854 A1 | 9/2015 | Druzdzel |
| 2017/0360083 A1 | 12/2017 | Prod |

FOREIGN PATENT DOCUMENTS

| | | |
|---|---|---|
| EP | 3050441 A1 | 8/2016 |
| EP | 3250058 A1 | 12/2017 |
| KR | 20160140788 A | 12/2016 |
| RU | 2013158831 A | 7/2015 |
| RU | 173272 U1 | 8/2017 |

OTHER PUBLICATIONS

European Search Report in application EP17208529, completed Jun. 18, 2018.

* cited by examiner

APPARATUS FOR MANUFACTURING OF MULTI-ELEMENT RODS OF TOBACCO INDUSTRY

BACKGROUND

The object of the invention is an apparatus for manufacturing of multi-element rods of the tobacco industry.

This invention relates to an apparatus for manufacturing of multi-segment rods of the tobacco industry wherein rod-like elements are transferred between conveyors along which the principally cylindrical elements of which the multi-segment rods are manufactured are axially lengthwise conveyed. In this document, the term of rod-like elements is to be understood as among others tobacco segments, tobacco rods, filter segments, filter rods made of one kind of material, multi-element filter rods comprising filter segments, rods containing elements changing the articles' aroma or giving such aroma, multi-element filter rods comprising filter segments and elements changing the filtering properties of filter materials used, multi-element rods comprising both filter and non-filter segments, multi-segment articles with a reduced tobacco content as well as cigarettes with a single-segment or multi-segment filter tip stuck on. Whereas the rod-like elements may be cylindrical, may deviate from the cylindrical shape, and also may have undercuts or hollows on both front and circumferential surface.

In the tobacco industry, it is common to put rod-like elements together in continuous trains of alternately different or the same elements, whereas multi-element rods are manufactured from such trains. These may include non-filter and filter elements with different filtering properties or alternately non-filter, filter elements and tobacco rods. The continuous elements trains are wrapped with a band of a wrapping material, for example a paper wrapper, forming a continuous rod, and are subjected to further processing, whereas in the first place they are cut into the abovementioned rods with a repeatable sequence of components.

There is a demand on the part of the tobacco industry manufacturers to put the rod-like elements together without gaps between the elements or with precisely determined gaps.

A difficult and very significant problem when putting elements together without gaps is to meet the expectation that the rod-like elements are to be pushed together, generally placed next to one another, in a repeatable manner. The feeding in a repeatable manner is understood as placing the elements in such a way that the influence of accidental factors on the final position of elements in the elements train is eliminated. Undesirable effects which may be caused by accidental factors include the formation of accidental gaps between the elements or excessive squeezing of the elements and consequently the deformation of the elements, which affects the quality of finished products.

The rod-like elements trains being put together and conveyed axially lengthwise are frequently transferred between rod-like element conveying apparatuses. Rod-like element transferring apparatuses are known from the prior art. For example from the document EP 1 763 306 B1 an apparatus for transferring individual rod-like elements or groups of rod-like elements, in this case of filter segments, is known. From the created elements train a continuous rod is formed and is cut into individual rods. At the time of transferring of the elements, the gaps necessary for correct transferring of the rod-like elements between successive rotational elements in the form of wheels provided with lugs on the circumference are maintained between individual groups of elements, whereas the groups of rod-like elements or the individual rod-like elements are placed in notches between the lugs. In order to form a rod-like elements train without gaps on a forming tape behind the transferring apparatus, the transferring tape moves with a speed being smaller than the circumferential speed of the last rotational element of the transferring apparatus. In the course of transferring of the rod-like elements onto the tape, there is friction between the elements and the paper wrapper (generally the wrapping material) situated on the forming tape. As a result of this, the rod-like elements arranged on the paper wrapper are not arranged in a repeatable manner, may be excessively squeezed or accidental gaps between the elements may occur. The speed of the transferring tape is smaller than the circumferential speed of the last rotational element, so the elements delivered by the last of the transferring wheels are pushed to the previously delivered elements. The elements are transferred along the paper wrapper moving with the tape speed. The glue which is usually applied on the paper wrapper may make it difficult to move the elements and the glue may accumulate between the elements. The elements placed on the paper wrapper have their own paper wrapping, it happens that the paper wrapper of the transferred elements is wrongly stuck, which may affect the correctness of the final position of the transferred group and the repeatability of the situation of neighbouring elements from the successive groups relative to one another. The apparatus shown in the abovementioned document EP 1 763 306 B1 maintains constant distances between neighbouring rod-like elements or groups of rod-like elements on the entire rod-like element conveying path. The rod-like elements are pushed close to one another only when these elements are placed onto the paper wrapper on the forming tape. That document does not disclose a method for bringing neighbouring elements or groups of elements closer to one another at the time of transferring so as to reduce shifting of the elements relative to the paper wrapper, generally relative to the wrapping material.

The problem to be solved by this invention is to develop an improved apparatus for transferring rod-like elements between conveying apparatuses on a manufacturing machine, whereas such apparatus will make it possible to gradually reduce the distances between the rod-like elements or the groups of elements, which will allow delivering the rod-like elements to the output conveying apparatus more smoothly, and in addition the position of the neighbouring groups of rod-like elements or individual rod-like elements will reduce the necessity of movement of the rod-like elements relative to the wrapping material. Furthermore, the transferring wheels should be provided with lugs which will ensure that the transferring of rod-like elements or groups of elements between successive wheels of the transferring apparatus will take place in a delicate way so as to prevent damaging of the rod-like elements in the course of transferring.

SUMMARY OF THE INVENTION

The object of the invention is an apparatus for manufacturing of multi-element rods of the tobacco industry comprising a feeding apparatus designed to feed rod-like elements, a transferring apparatus designed to transfer the rod-like elements or groups of the rod-like elements from the rod-like element feeding apparatus to a forming apparatus, comprising a first rotational element provided with first lugs, having a first thickness, immobile relative to the first rotational element, and notches between the first lugs, a second rotational element provided with second lugs, having a second thickness, immobile relative to the second rotational element, and notches between the second lugs, a third rotational element provided with third lugs, having a third thickness, immobile relative to the third rotational element, and notches between the third lugs, used to convey the rod-like elements. The notches between the lugs are adapted to receive and convey individual rod-like elements or groups of rod-like elements. The first rotational element, the second rotational element and the third rotational element are arranged and adapted to guide the rod-like elements successively through the first rotational element, the second rotational element and the third rotational element. The apparatus further comprises the forming apparatus designed to form a continuous multi-element rod and a cutting apparatus designed to cut the continuous multi-element rod into individual multi-element rods. The apparatus according to the invention is characterised in that the third lugs have the third thickness smaller than the first thickness of the first lugs.

Preferably, the apparatus according to the invention is characterised in that the third lugs have the third thickness smaller than the second thickness of the second lugs.

Preferably, the apparatus according to the invention is characterised in that the second lugs have the second thickness smaller than the first thickness of the first lugs.

Preferably, the apparatus according to the invention is characterised in that the third lugs have the ends having a thickness smaller than the third thickness at the base of the third lugs.

Preferably, the apparatus according to the invention is characterised in that the second lugs have the ends having a thickness smaller than the second thickness at the base of the second lugs.

Preferably, the apparatus according to the invention is characterised in that the first lugs have the ends having a thickness smaller than the first thickness at the base of the first lugs.

Preferably, the apparatus according to the invention is characterised in that the thickness of the third lugs constitutes less than two thirds of the first thickness of the first lugs.

Preferably, the apparatus according to the invention is characterised in that the diameter of the third rotational element is smaller than the diameter of the first rotational element.

Preferably, the apparatus according to the invention is characterised in that the diameter of the third rotational element is smaller than the diameter of the second rotational element.

Preferably, the apparatus according to the invention is characterised in that the diameter of the second rotational element is smaller than the diameter of the first rotational element.

The object of the invention is further an apparatus for manufacturing of multi-element rods of the tobacco industry comprising a feeding apparatus designed to feed the rod-like elements, a transferring apparatus designed to transfer the rod-like elements or groups of the rod-like elements from the apparatus feeding the rod-like elements to a forming apparatus, comprising a first rotational element provided with first lugs, having a first thickness, immobile relative to the first rotational element, and the notches between the first lugs, a second rotational element provided with second lugs, having a second thickness, immobile relative to the second rotational element, and the notches between the second lugs, a third rotational element without lugs, used to convey the rod-like elements. The notches between the first lugs on the first rotational element and the notches between the second lugs on the second rotational element as well as the circumferential surface of the third rotational element are adapted to receive and convey individual rod-like elements or groups of rod-like elements. The first rotational element, the second rotational element and the third rotational element are arranged and adapted to guide the rod-like elements successively through the first rotational element, the second rotational element and the third rotational element. The apparatus further comprises the forming apparatus designed to form a continuous multi-element rod, and a cutting apparatus designed to cut the continuous multi-element rod into individual multi-element rods. The apparatus according to the invention is characterised in that the second lugs have the second thickness smaller than the first thickness of the first lugs.

Preferably, the apparatus according to the invention is characterised in that the second lugs have the ends having a thickness smaller than the second thickness at the base of the second lugs.

Preferably, the apparatus according to the invention is characterised in that the first lugs have the ends having a thickness smaller than the first thickness at the base of the first lugs.

Preferably, the apparatus according to the invention is characterised in that the diameter of the third rotational element is smaller than the diameter of the first rotational element.

Preferably, the apparatus according to the invention is characterised in that the diameter of the third rotational element is smaller than the diameter of the second rotational element.

The use of a transferring apparatus wherein the distances between the rod-like elements or the groups of rod-like elements are gradually reduced by means of wheels having notches adapted to the rod-like elements in the group being fed resulted in an increase of the quality of manufactured rods. One of the quality parameters is precise cutting of the elements, especially long elements, whereas the cutting must be performed in a narrow tolerance range. Due to the reduction of stresses occurring at the time of transferring of the segments onto the segments train receiving conveyor, an increase in the accuracy of rod cutting was observed.

DESCRIPTION OF THE DRAWING

The object of the invention was shown in preferred embodiments in a drawing in which.

DETAILED DESCRIPTION

Figure 1:
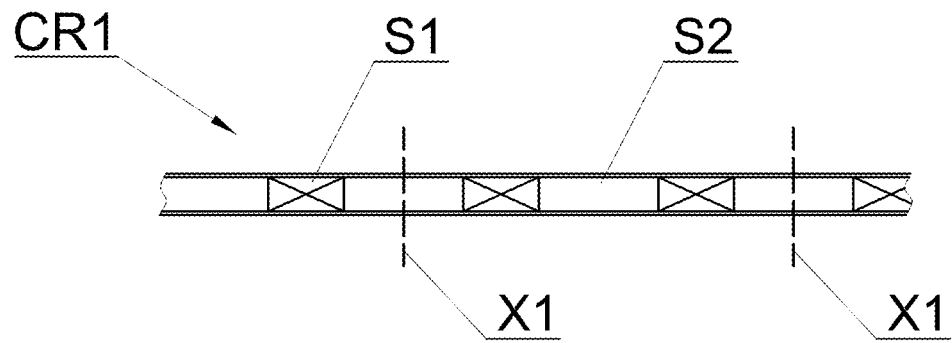
FIGS. 1 and 2 show examples of rod-like elements trains.
Figure 2:
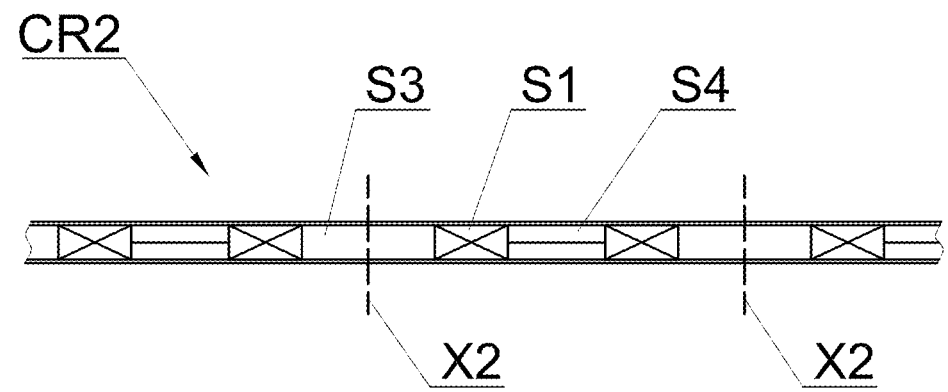

FIGS. 1 and 2 show fragments of exemplary continuous multi-element rods CR1 and CR2 formed from trains of rod-like elements S1, S2, S3 and S4, respectively, prepared during the production and manufactured as a result of the operation of a machine for manufacturing multi-element rods. The shown continuous rods are cut into multi-segment rods, FIGS. 1 and 2 show exemplary cutting points on the continuous rods with broken lines X1 and X2. The distance between the successive lines X1, X2, respectively, shows the length of the manufactured rods.

Figure 3:
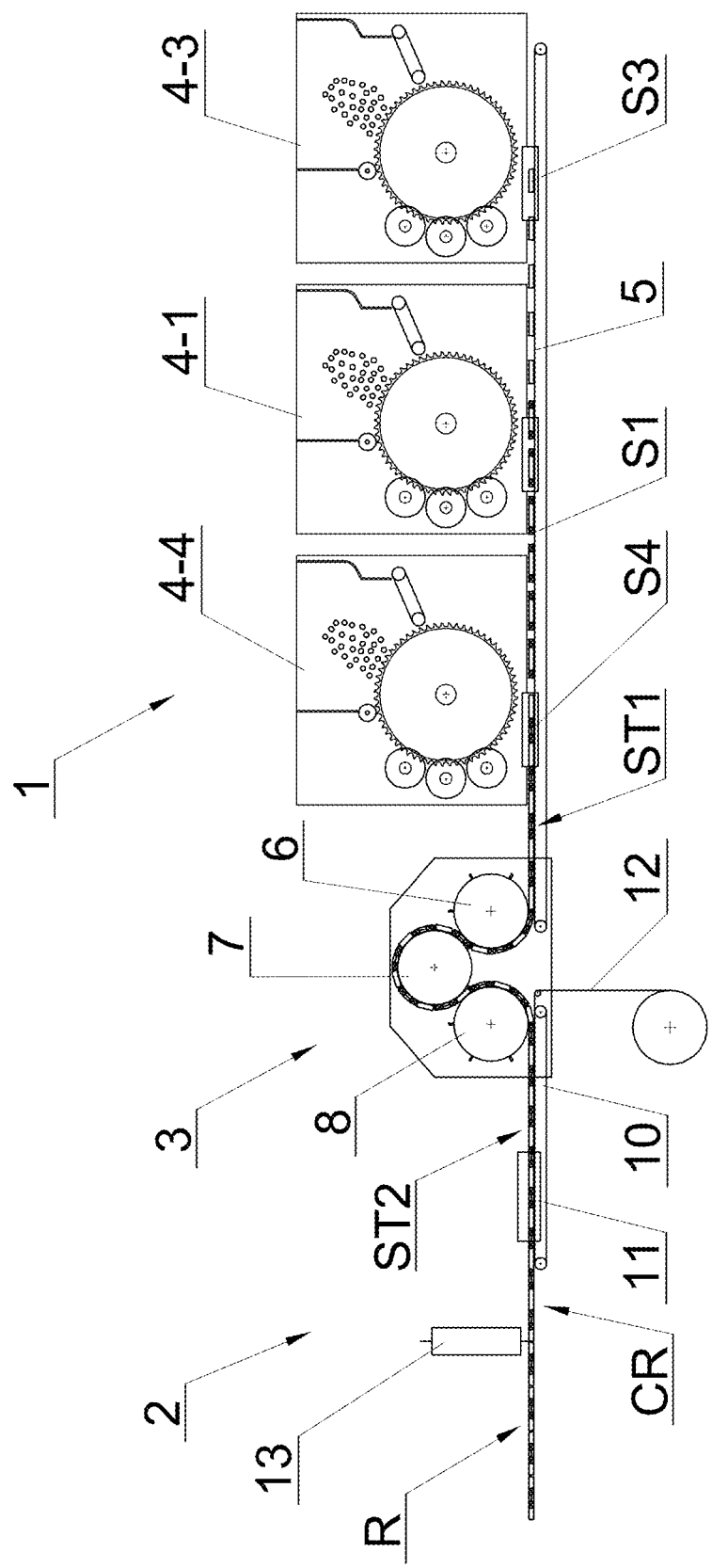
FIG. 3 shows a fragment of a machine for manufacturing multi-segment rods and a first embodiment of a transferring apparatus.

FIG. 3 shows a fragment of a machine for manufacturing multi-element filter rods. The machine has a feeding area 1 to which the filter material rods are fed, a forming area 2 in which the multi-element rods R are manufactured, and a transferring apparatus 3 which transfers the rod-like elements from the feeding area 1 to the forming area 2. The feeding area 1 comprises feeding modules 4-1, 4-3 and 4-4 designed to feed the filter rods from which the rod-like elements S1, S3 and S4, respectively, such as included in the continuous multi-segment rod CR2, are manufactured. The rod-like elements S1, S3 and S4 are placed onto a feeder 5 which conveys them to the transferring apparatus 3, whereas the stream of the rod-like elements is denoted as ST1. The feeding area 1 may be replaced by any other feeding apparatus adapted to feed the rod-like elements in a stream ST1 axially one after another. The transferring apparatus 3 transfers the rod-like elements S1, S3, S4 delivered in the stream ST1 to the forming area 2. The transferring apparatus 3 transfers the rod-like elements S1, S3, S4 in groups G, whereas the groups G move within the transferring apparatus 3 at certain distances to one another, i.e. they do not touch one another. The transferring apparatus 3 in the first embodiment is provided with three wheels 6, 7, 8, whereas the groups G successively pass through the wheels 6, 7, 8 and are placed onto a forming conveyor 10 belonging to the forming apparatus 11, whereas a continuous wrapping material 12 is theretofore placed onto the forming conveyor, and the stream ST2 of the rod-like elements S1, S3, S4 is placed onto this continuous wrapping material 12. The groups G in the stream ST2 may have gaps between the successive groups or may be conveyed without gaps so that the rod-like elements S1, S3, S4 keep contact with one another. The train ST2 of the rod-like elements S1, S3, S4 moving on the forming conveyor 10 is wrapped in the wrapping material 12 by means of the forming apparatus 11. The manufactured continuous multi-element rod CR moves further and is cut by means of a cutting head 13 into individual multi-element rods R.

Figure 4:
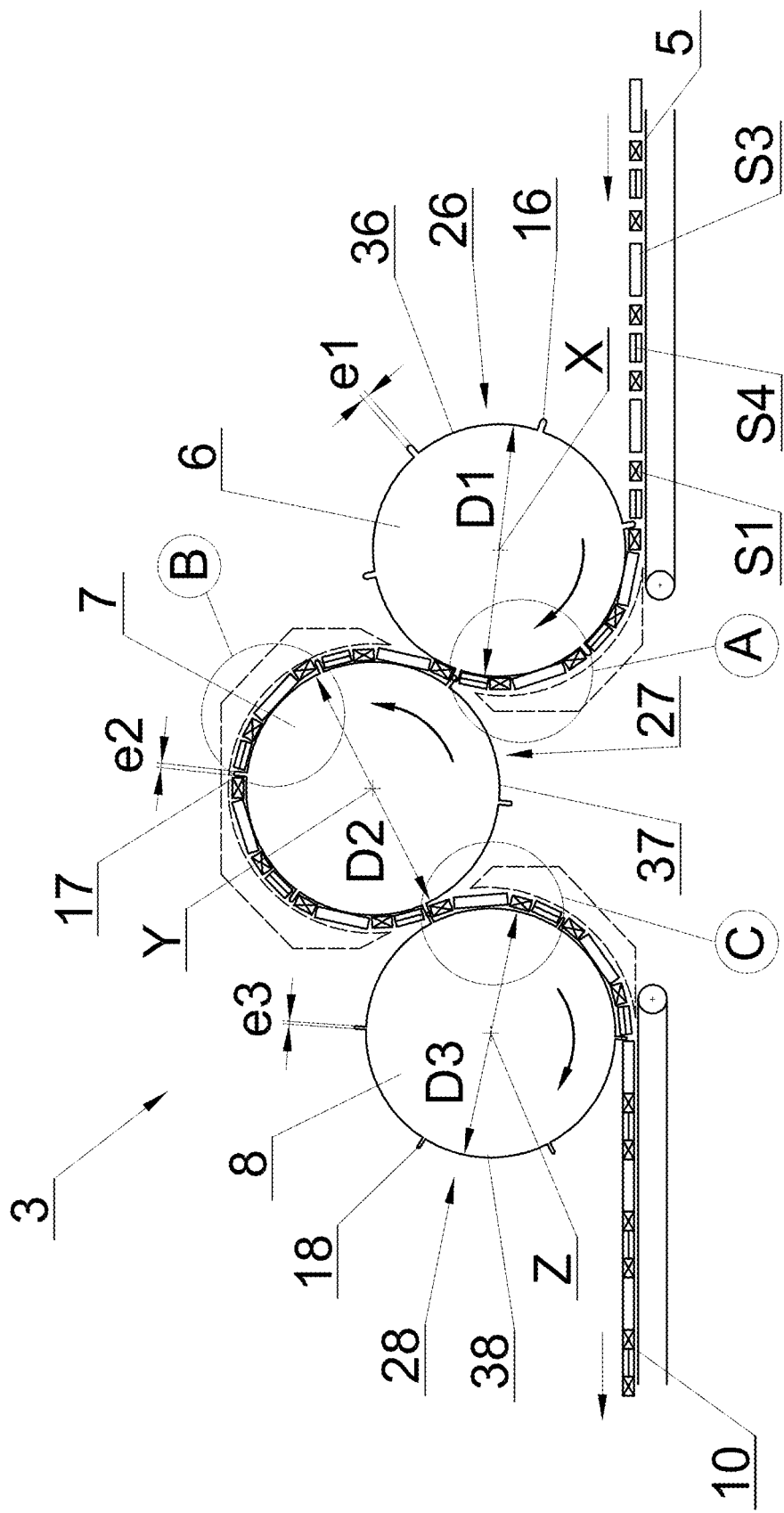
FIG. 4 shows the first embodiment of the transferring apparatus.
Figure 5:
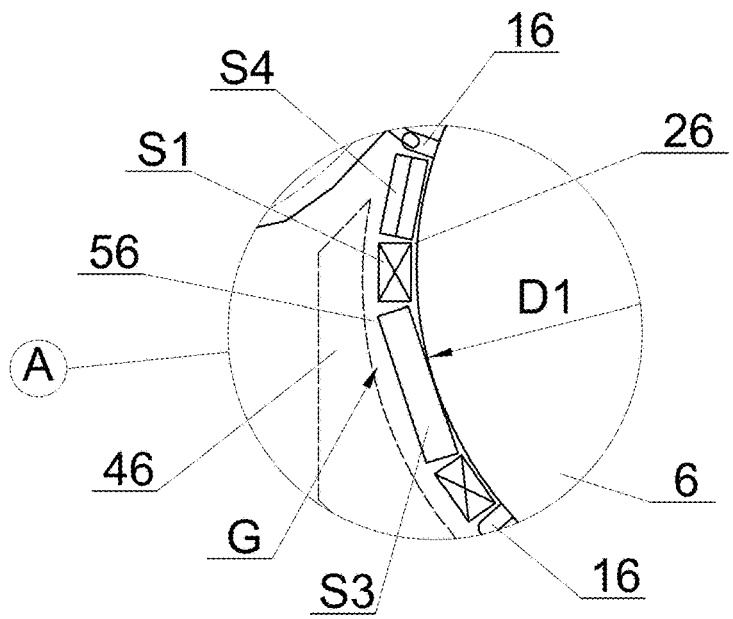
FIGS. 5, 6 and 7 show enlarged fragments of the apparatus of FIG. 4.
Figure 6:
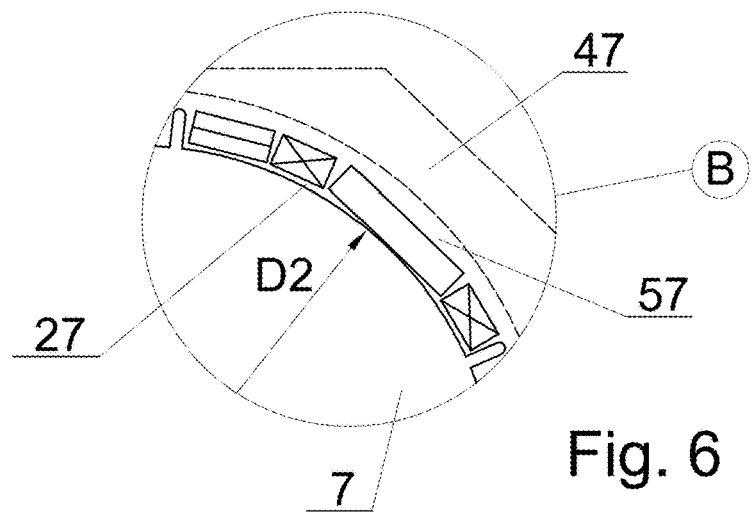
Figure 7:
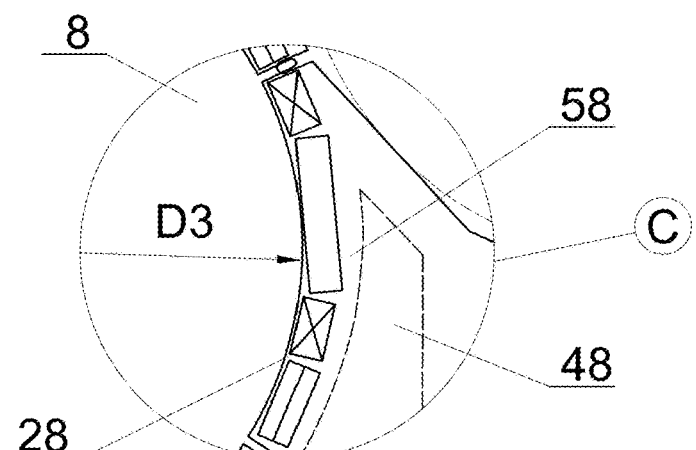

As shown in FIG. 4, the rod-like elements S1, S3, S4 are transferred from the feeder 5 onto the first wheel 6 having the axis of rotation X. Then the rod-like elements S1, S3, S4 are transferred from the wheel 6 onto the wheel 7 having the axis of rotation Y and further from a rotational element 7 onto the wheel 8 having the axis of rotation Z, and from this rotational element 8 they are transferred onto the forming conveyor 10. The rod-like elements S1, S3, S4 are received on the wheel 6 and conveyed on the wheels 6, 7, 8 in the groups G, whereas the groups G are formed on the wheel 6 in notches 26 between lugs 16, the lugs 16 are also visible in the enlarged fragment A of FIG. 4 shown in FIG. 5. The elements S1, S3, S4, as the group G, are transferred onto the wheel 7 and conveyed in the notches 27 between the lugs 17 (FIG. 6), while on the wheel 8 they are conveyed in the notches 28 between the lugs 18 (FIG. 7). The wheels 6, 7, 8 may be replaced with other rotational elements on whose circumferential surface the lugs are disposed, between which the notches designed to receive the rod-like elements are formed. For example the rotational elements may have the form of drums having horizontal axes or inclined axes.

The lugs 16 in the first wheel 6 have a thickness e1, the lugs 17 on the second wheel 7 have a thickness e2, while the lugs 18 on the third wheel 8 have a thickness e3. During the operation of the apparatus, the rod-like elements S1, S3, S4 come into contact with the bottom surface 36 of the notch 26 on the wheel 6, whereas the distance between the groups G corresponds to the thickness e1 of the lugs 16. After transferring onto the second wheel 7 into the notches 27, the distance between the groups G corresponds to the thickness e2 of the lugs 17, whereas the distance between the groups G on the third wheel corresponds to the thickness e3 of the lugs 18 on the third wheel 8. According to the invention, the thickness e3 is smaller than the thickness e1, the thickness e2 may be equal to the thickness e1 or the thickness e3, whereas preferably the thickness e3 is smaller than the thickness e2, and the thickness e2 is smaller than the thickness e1.

The bottom surfaces 36 of the notches 26 are situated on a cylindrical surface with the diameter D1, the bottom surfaces 37 of the notches 27 are situated on a cylindrical surface with the diameter D2, whereas the bottom surfaces 38 of the notches 28 are situated on a cylindrical surface with the diameter D3. The diameters D1, D2 and D3 may be equal to one another, whereas preferably the diameter D3 is smaller than the diameter D2, and the diameter D2 is smaller than the diameter D1.

The rod-like elements S1, S3, S4 move along a path composed of three arcs and are guided by guides 46, 47 and 48 which together with the bottom surfaces 36, 37, 38 of the notches 26, 27, 28 form channels 56, 57, 58 for the rod-like elements S1, S3, S4. The transferring apparatus 3 is further provided with not shown guides being parallel to the drawing plane and situated before and behind the surface of the wheels 6, 7 and 8.

The reduction of the distance between the groups G takes place in three stages, when transferring the groups G between the first wheel 6 and the second wheel 7, when transferring the groups G between the second wheel 7 and the third wheel 8, and when transferring the groups G onto the forming conveyor 10.

The rod-like elements S1, S3, S4 move along a path composed of three arcs and are guided by guides 46, 47 and 48 which together with the bottom surfaces 36, 37, 38 of the notches 26, 27, 28 form channels 56, 57, 58 for the rod-like elements S1, S3, S4. The transferring apparatus 3 is further provided with not shown guides being parallel to the drawing plane and situated before and behind the surface of the wheels 6, 7 and 8.

In order to obtain the stream ST2 in a configuration in which the rod-like elements S1, S3, S4 remain in contact with the neighbouring rod-like elements it is necessary that the circumferential speed of the third rotational element 8 is greater than the movement speed of the forming conveyor 10. Then, in the process of placing of the rod-like elements S1, S3, S4 conveyed in the groups G, the final pushing together of the groups G will take place in order to eliminate the gaps between these groups, whereas such gaps correspond to the thickness e3 of the lugs 18 on the third wheel 8.

Figure 8:
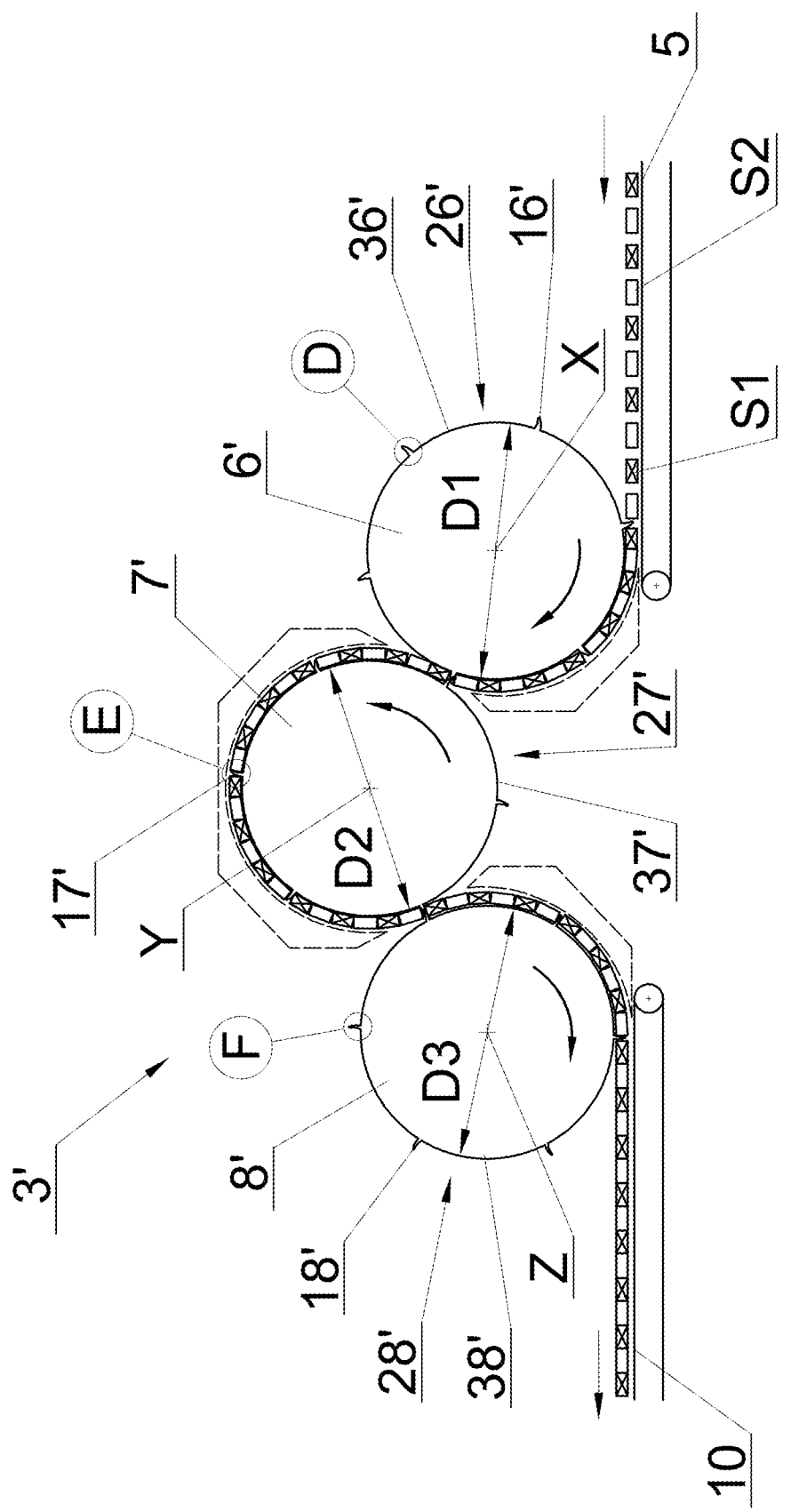
FIG. 8 shows a second embodiment of the transferring apparatus.
Figure 9:
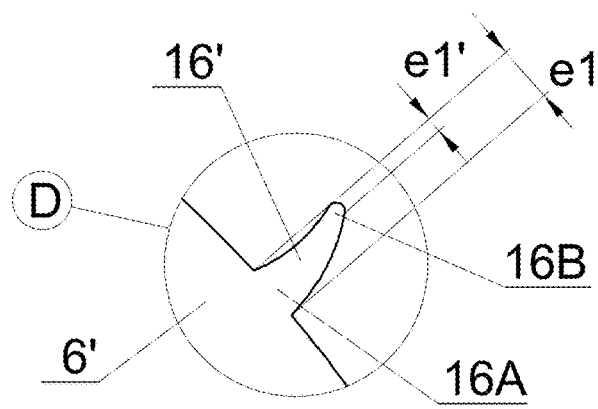
FIGS. 9, 10, 11, 12 show enlarged fragments of the transferring apparatus.
Figure 10:
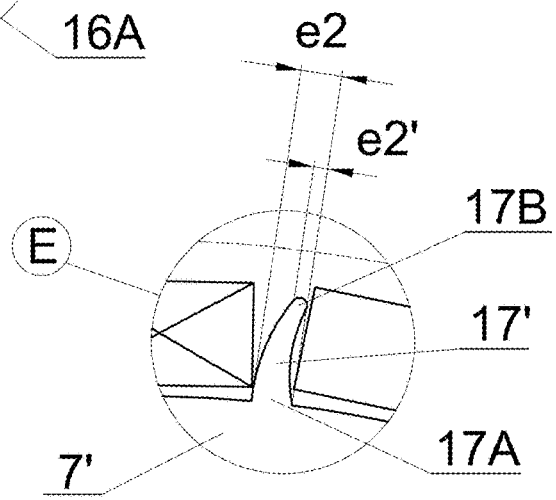
Figure 11:
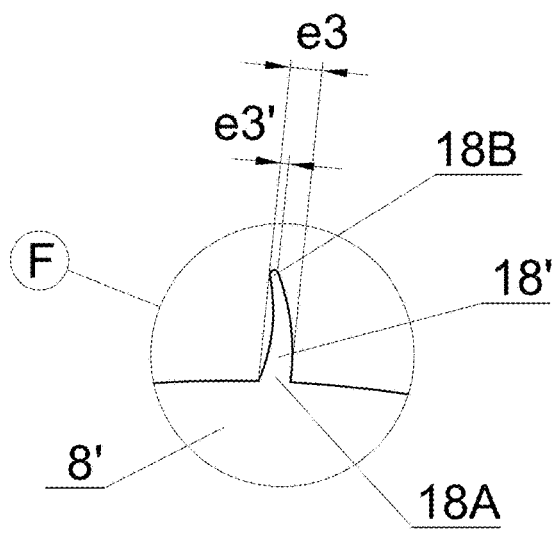
Figure 12:
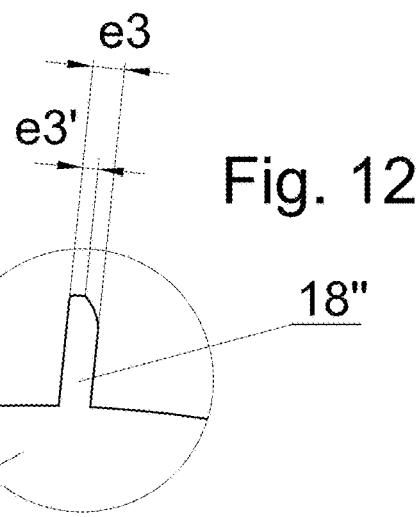

FIG. 8 shows the second embodiment wherein all wheels 6', 7', 8' of the transferring apparatus 3' have lugs 16', 17', 18' and notches 26', 27', 28' having cylindrical bottom surfaces 36', 37', 38', respectively, whereas the elements train consists of alternately situated elements S1 and S2 as in the continuous rod CR1. The first transferring wheel 6' is provided with the lugs 16' having a variable thickness, which was shown in enlargement D in FIG. 9. The thickness of the lug 16' at its base 16A is equal to e1, whereas the thickness of the end 16B of the lug 16' is equal to e1'. The lug 16' may be designed so that its sides are shaped rectilinearly or arched as shown in FIG. 9. The thickness of the lug 17' at its base 17A is equal to e2, whereas the thickness of the end 17B of the lug 17' is equal to e2'. Similarly, the sides of the lug 17' may be shaped rectilinearly or arched (FIG. 10). The thickness of the lug 18' at its base 18A is equal to e3, whereas the thickness of the end 18B of the lug 18' is equal to e3' (FIG. 11). The curvatures of the lugs 16', 17' and 18' are adapted to the movement of the groups G along the path of movement of the rod-like elements so as not to block the movement of the rod-like elements in the group G. Due to the shaping of the lugs in such a way that their ends are thinner, the groups G of the rod-like elements are transferred in a delicate way, the front surfaces of individual elements are not damaged because the lugs of the wheel from which the rod-like elements are transferred do not catch the edges of rod-like elements of any group when pulling out of the gap between the groups G. Similar to the first embodiment, the diameter D3 is smaller than the diameter D1, whereas the diameter D2 may be greater than the diameter D3 and smaller than the diameter D1. Similar to the first embodiment, the transferring apparatus may be designed so that the diameters D3 and D2 are equal, and the diameter D1 is greater than the diameters D3 and D2. The transferring apparatus may be designed so that the diameters D1 and D2 are equal, and the diameter D3 is smaller than the diameters D1 and D2. FIG. 12 shows another embodiment of the third lug 18" which has one rectilinear and the other edge rounded.

Figure 13:
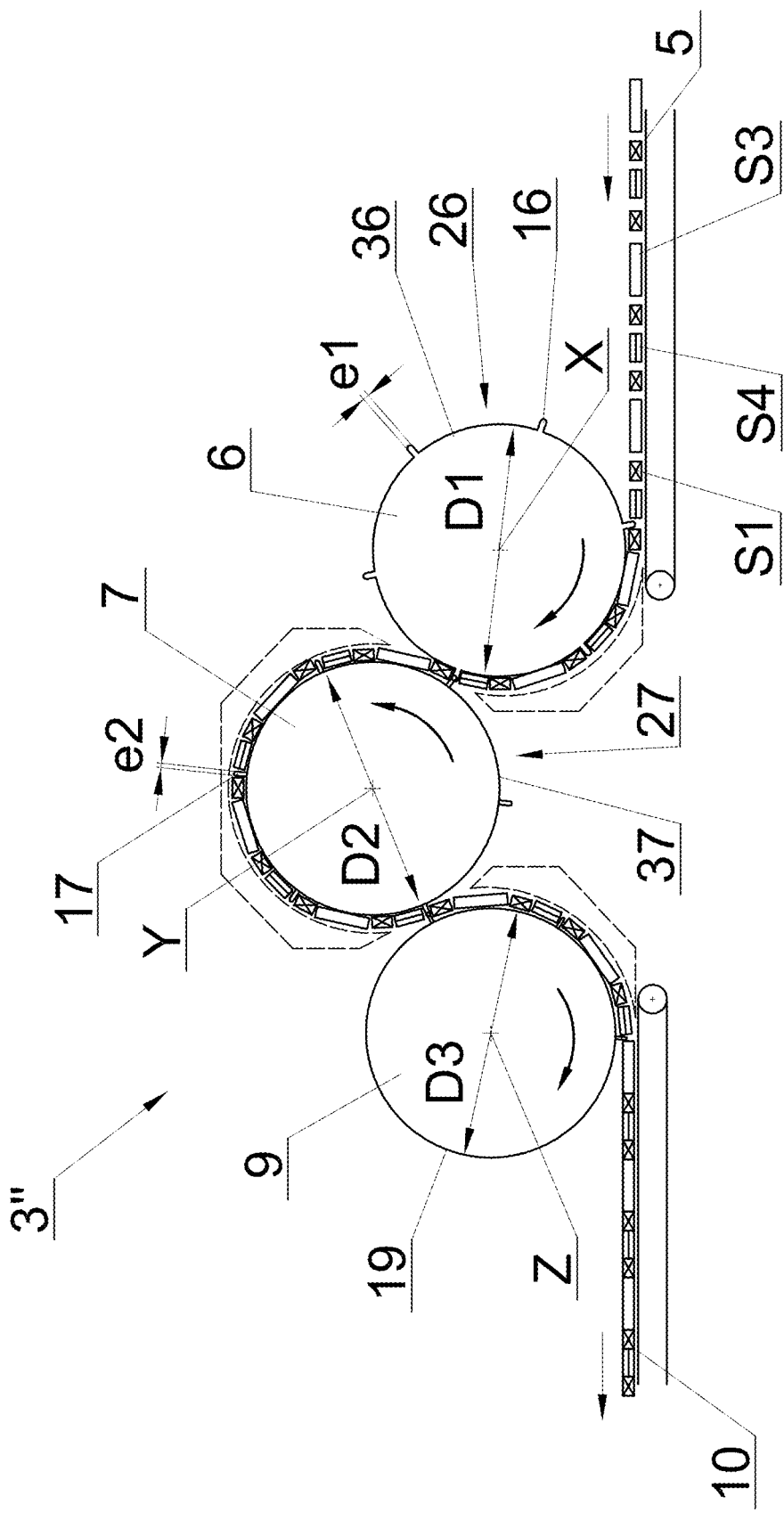
FIG. 13 shows a third embodiment of the transferring apparatus.

FIG. 13 shows the third embodiment of the transferring apparatus 3" wherein the first wheel 6 and the second wheel 7 are the same as described in the first embodiment, while the third wheel 9 is a wheel without lugs. The lugs on the first wheel 6 and on the second wheel 7 are shaped similar to the first embodiment, whereas the first lug 16 has the thickness e1, and the second lug 17 has the thickness e2. The diameter D1 may be equal to the diameter D2, whereas preferably the diameter D2 is smaller than the diameter D1. The use of the third wheel 9 without lugs gives advantageous effects related to the reduction of stresses occurring between successive rod-like elements moving in the groups G yet on the circumferential surface 19 of the wheel 9, i.e. before placing onto the wrapping material. It was observed that a gradual decrease in speed of the successive rod-like elements resulted in the reduction of stresses between the contacting rod-like elements.

In the third embodiment, the groups G are pushed together in two stages, in the first stage the rod-like elements are transferred from the first wheel 6 to the second wheel 7. The second stage takes place from the moment of transferring of the rod-like elements from the second wheel 7 onto the third wheel 9 until the moment of transferring of the rod-like elements onto the forming conveyor 10.

The invention claimed is:

1. An apparatus for manufacturing of multi-element rods of the tobacco industry comprising
    a feeding apparatus (5) designed to feed rod-like elements (S1, S2, S3, S4),
    a transferring apparatus (3, 3') designed to transfer the rod-like elements (S1, S2, S3, S4) or groups (G) of the rod-like elements (S1, S2, S3, S4) from the apparatus (5) feeding the rod-like elements (S1, S2, S3, S4) to a forming apparatus (11), comprising
    a first rotational element (6, 6') provided with first lugs (16, 16'), having a first thickness (e1), immobile relative to the first rotational element (6, 6'), and notches (26, 26') between the first lugs (16, 16'),
    a second rotational element (7, 7') provided with second lugs (17, 17'), having a second thickness (e2), immobile relative to the second rotational element (7, 7'), and notches (27, 27') between the second lugs (17, 17'),
    a third rotational element (8, 8') provided with third lugs (18, 18'), having a third thickness (e3), immobile relative to the third rotational element (8, 8'), and notches (28, 28') between the third lugs (18, 18'),
    used to convey the rod-like elements (S1, S2, S3, S4), the notches (26, 26') between the first lugs (16, 16'), the notches (27, 27') between the second lugs (17, 17') and the notches (28, 28') between the third lugs (18, 18') being adapted to receive and convey the individual rod-like elements (S1, S2, S3, S4) or the groups (G) of the rod-like elements (S1, S2, S3, S4), whereas
    the first rotational element (6, 6'), the second rotational element (7, 7') and the third rotational element (8, 8') are arranged and adapted to guide the rod-like elements (S1, S2, S3, S4) successively through the first rotational element (6, 6'), the second rotational element (7, 7') and the third rotational element (8, 8'),
    the apparatus comprises the forming apparatus (11) designed to form a continuous multi-element rod (CR), a cutting apparatus (13) designed to cut the continuous multi-element rod (CR) into individual multi-element rods (R),
    characterised in that
    the third lugs (18, 18') have the third thickness (e3) smaller than the first thickness (e1) of the first lugs (16, 16')
    further characterised in that the third lugs (18') have ends (18B) having a thickness (e3') smaller than the third thickness (e3) at base (18A) of the third lugs (18').

2. The apparatus as in claim 1 characterised in that the third lugs (18, 18') have the third thickness (e3) smaller than the second thickness (e2) of the second lugs (17, 17').

3. The apparatus as in claim 1 characterised in that the second lugs (17, 17') have the second thickness (e2) smaller than the first thickness (e1) of the first lugs (16, 16').

4. The apparatus as in claim 1 characterised in that the second lugs (17') have ends (17B) having a thickness (e2') smaller than the second thickness (e2) at base (17A) of the second lugs (17').

5. The apparatus as in claim 1 characterised in that the first lugs (16') have ends (16B) having a thickness (e1') smaller than the first thickness (e1) at base (16A) of the first lugs (16').

6. The apparatus as in claim 1 characterised in that the third thickness (e3) of the third lugs (18, 18') constitutes less than two thirds of the first thickness (e1) of the first lugs (16, 16').

7. The apparatus as in claim 1 characterised in that the diameter (D3) of the third rotational element (8, 8') is smaller than the diameter (D1) of the first rotational element (6, 6').

8. The apparatus as in claim 1 characterised in that the diameter (D3) of the third rotational element (8, 8') is smaller than the diameter (D2) of the second rotational element (7, 7').

9. The apparatus as in claim 1 characterised in that the diameter (D2) of the second rotational element (7, 7') is smaller than the diameter (D1) of the first rotational element (6, 6').

10. An apparatus for manufacturing of multi-element rods of the tobacco industry comprising a feeding apparatus (5) designed to feed rod-like elements (S1, S3, S4), a transferring apparatus (3") designed to transfer the rod-like elements (S1, S3, S4) or groups (G) of the rod-like elements (S1, S3, S4) from the apparatus (5) feeding the rod-like elements (S1, S3, S4) to a forming apparatus (11), comprising a first rotational element (6, 6') provided with first lugs (16, 16'), having a first thickness (e1), immobile relative to the first rotational element (6, 6'), and notches (26, 26') between the first lugs (16, 16'), a second rotational element (7, 7') provided with second lugs (17, 17'), having a second thickness (e2), immobile relative to the second rotational element (7, 7'), and notches (27, 27') between the second lugs (17, 17'), a third rotational element (9) without lugs, used to convey the rod-like elements (S1, S3, S4), whereas the notches (26, 26') between the first lugs (16, 16') on the first rotational element (6, 6') and the notches (27, 27') between the second lugs (17, 17') on the second rotational element (7, 7') as well as the circumferential surface (19) of the third rotational element (9) are adapted to receive and convey the individual rod-like elements (S1, S3, S4) or the groups (G) of the rod-like elements (S1, S3, S4), whereas the first rotational element (6, 6'), the second rotational element (7, 7') and the third rotational element (9) are arranged and adapted to guide the rod-like elements (S1, S3, S4) successively through the first rotational element (6, 6'), the second rotational element (7, 7') and the third rotational element (9), the apparatus comprises the forming apparatus (11) designed to form a continuous multi-element rod (CR), a cutting apparatus (13) designed to cut the continuous multi-element rod (CR) into individual multi-element rods (R), characterised in that the second lugs (17, 17') have the second thickness (e2) smaller than the first thickness (e1) of the first lugs (16, 16').

11. The apparatus as in claim 10 characterised in that the second lugs (17') have ends (17B) having the thickness (e2') smaller than the second thickness (e2) at base (17A) of the second lugs (17').

12. The apparatus as in claim 10 characterised in that the first lugs (16') have ends (16B) having the thickness (e1') smaller than the first thickness (e1) at base (16A) of the first lugs (16').

13. The apparatus as in claim 10 characterised in that the diameter (D3) of the third rotational element (9) is smaller than the diameter (D1) of the first rotational element (6, 6').

14. The apparatus as in claim 10 characterised in that the diameter (D3) of the third rotational element (9) is smaller than the diameter (D2) of the second rotational element (7, 7').

15. An apparatus for manufacturing of multi-element rods of the tobacco industry comprising a feeding apparatus (5) designed to feed rod-like elements (S1, S2, S3, S4), a transferring apparatus (3, 3') designed to transfer the rod-like elements (S1, S2, S3, S4) or groups (G) of the rod-like elements (S1, S2, S3, S4) from the apparatus (5) feeding the rod-like elements (S1, S2, S3, S4) to a forming apparatus (11), comprising a first rotational element (6, 6') provided with first lugs (16, 16'), having a first thickness (e1), immobile relative to the first rotational element (6, 6'), and notches (26, 26') between the first lugs (16, 16'), a second rotational element (7, 7') provided with second lugs (17, 17'), having a second thickness (e2), immobile relative to the second rotational element (7, 7'), and notches (27, 27') between the second lugs (17, 17'), a third rotational element (8, 8') provided with third lugs (18, 18'), having a third thickness (e3), immobile relative to the third rotational element (8, 8'), and notches (28, 28') between the third lugs (18, 18'), used to convey the rod-like elements (S1, S2, S3, S4), the notches (26, 26') between the first lugs (16, 16'), the notches (27, 27') between the second lugs (17, 17') and the notches (28, 28') between the third lugs (18, 18') being adapted to receive and convey the individual rod-like elements (S1, S2, S3, S4) or the groups (G) of the rod-like elements (S1, S2, S3, S4), whereas the first rotational element (6, 6'), the second rotational element (7, 7') and the third rotational element (8, 8') are arranged and adapted to guide the rod-like elements (S1, S2, S3, S4) successively through the first rotational element (6, 6'), the second rotational element (7, 7') and the third rotational element (8, 8'), the apparatus comprises the forming apparatus (11) designed to form a continuous multi-element rod (CR), a cutting apparatus (13) designed to cut the continuous multi-element rod (CR) into individual multi-element rods (R), characterised in that the third lugs (18, 18') have the third thickness (e3) smaller than the first thickness (e1) of the first lugs (16, 16'), further characterised in that the diameter (D3) of the third rotational element (8, 8') is smaller than the diameter (D1) of the first rotational element (6, 6').

* * * * *